Dec. 9, 1958     F. L. TRUMP     2,863,583
TANK
Filed May 3, 1954     4 Sheets-Sheet 1
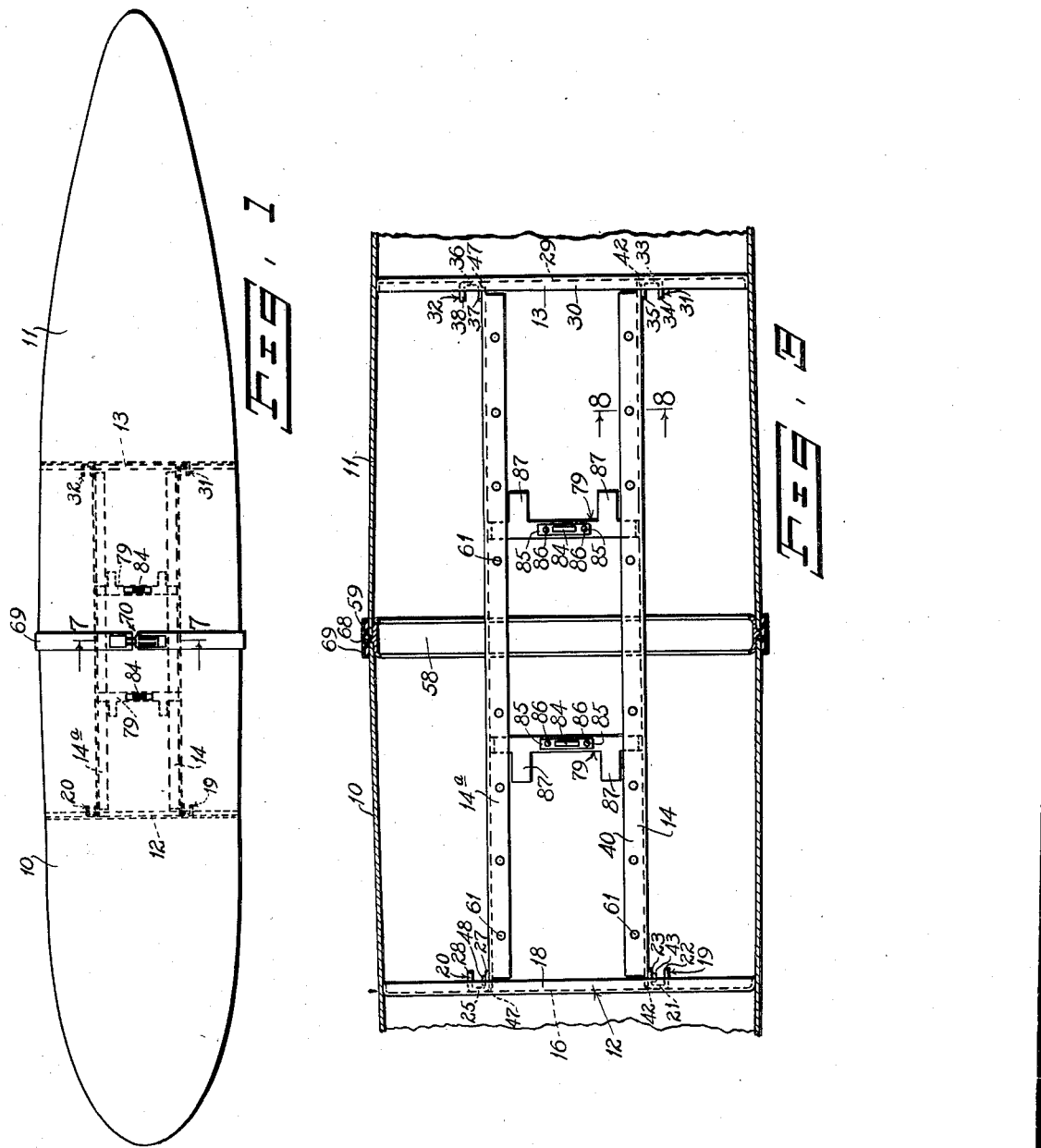
INVENTOR.
Frederic L. Trump
BY
ATTORNEY.

Dec. 9, 1958 F. L. TRUMP 2,863,583
TANK
Filed May 3, 1954 4 Sheets-Sheet 2
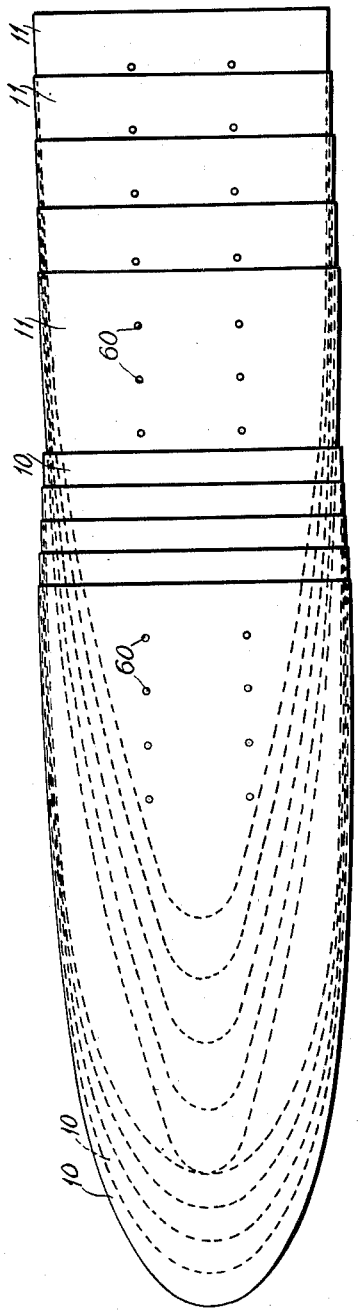
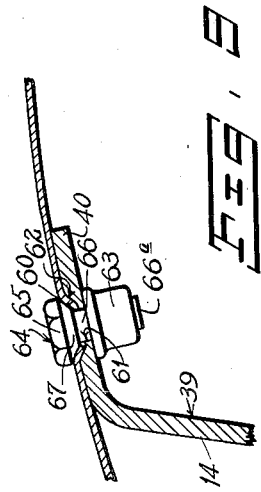
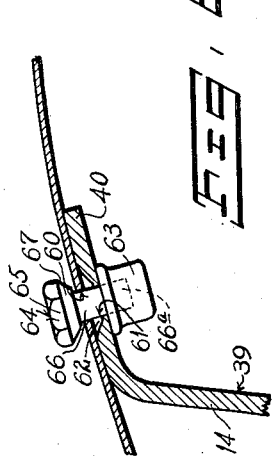
INVENTOR.
Frederic L. Trump
BY
*Charles S. Wilson*
ATTORNEY.

Dec. 9, 1958  F. L. TRUMP  2,863,583
TANK
Filed May 3, 1954  4 Sheets-Sheet 3
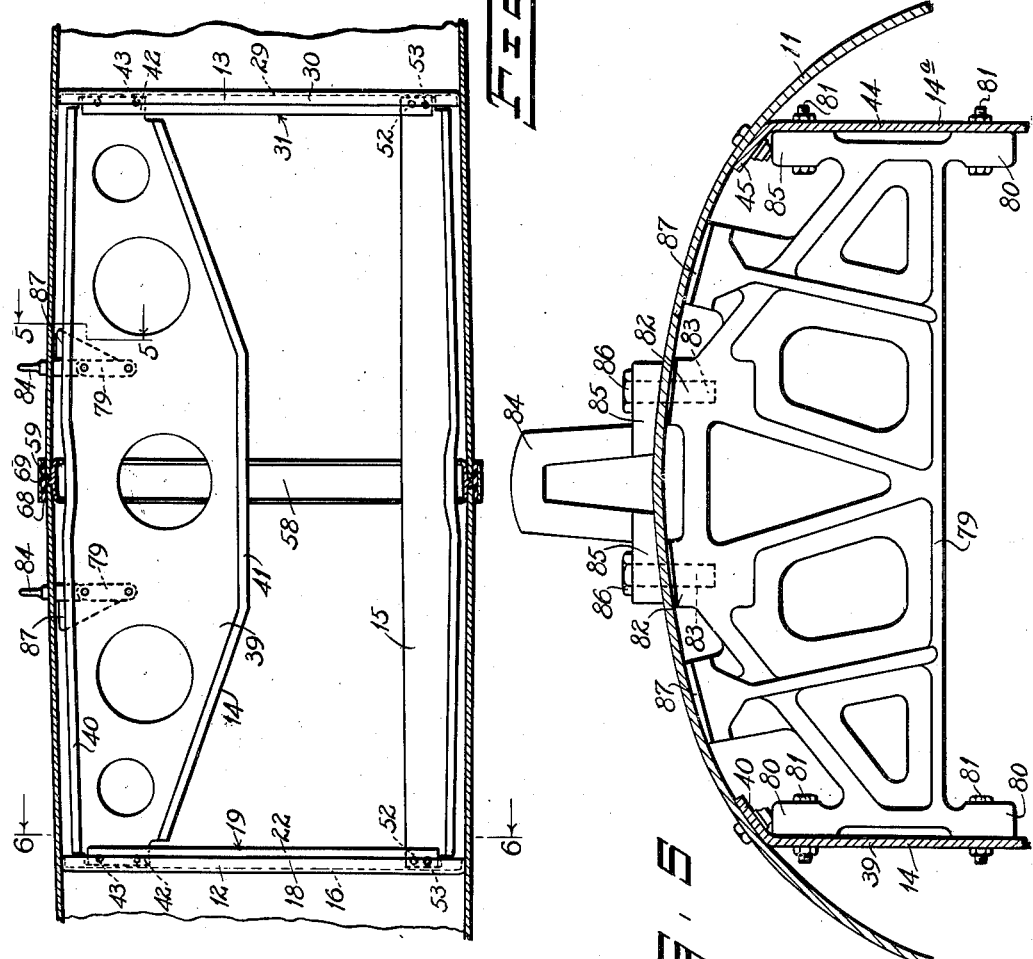
INVENTOR.
Frederic L. Trump
BY
Charles S. Wilson
ATTORNEY.

Dec. 9, 1958 F. L. TRUMP 2,863,583
TANK
Filed May 3, 1954 4 Sheets-Sheet 4
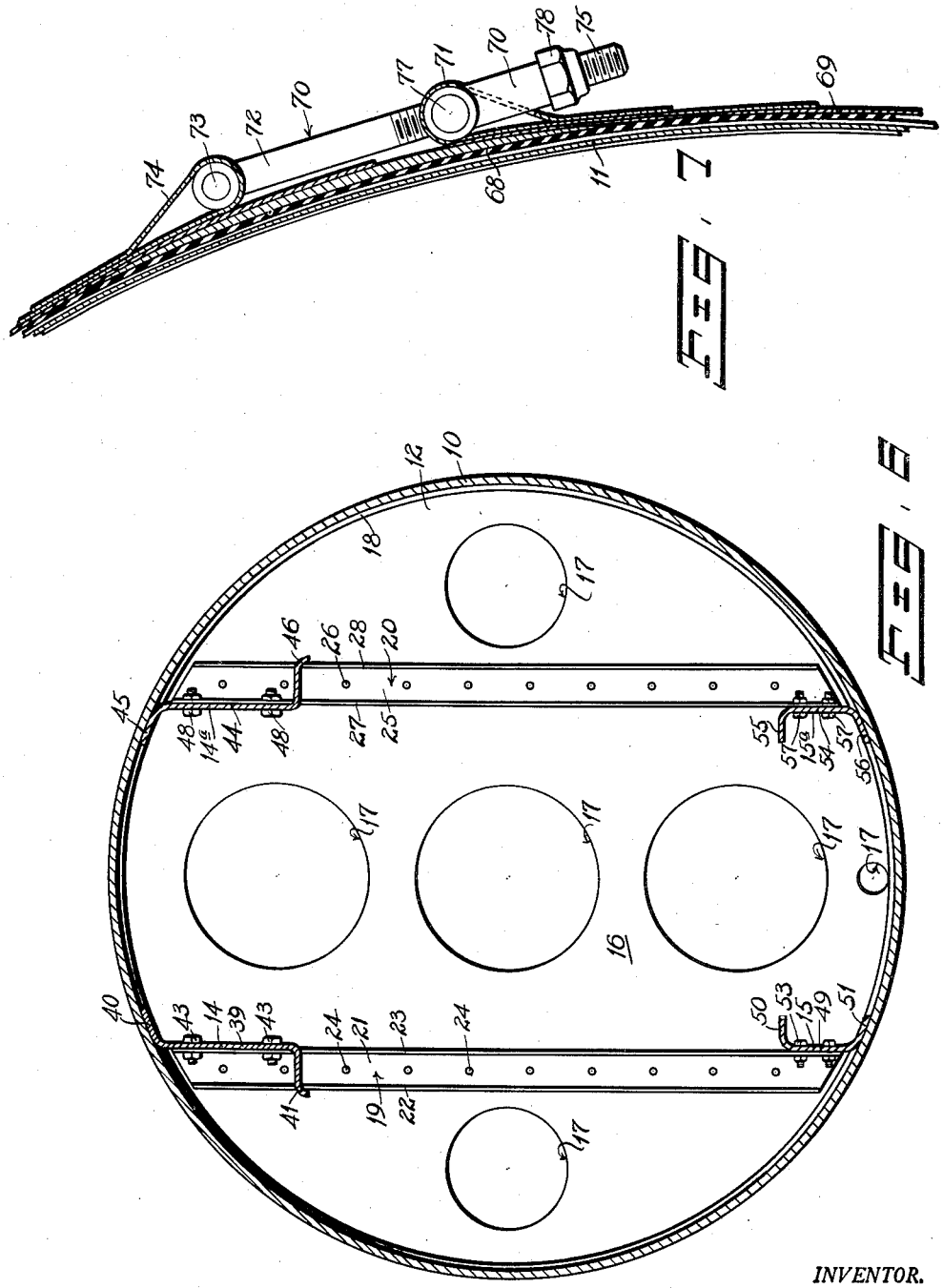
INVENTOR.
Frederic L. Trump
BY
Charles S. Wilson
ATTORNEY.

United States Patent Office 2,863,583
Patented Dec. 9, 1958

2,863,583

TANK

Frederic L. Trump, Roslyn Estates, N. Y., assignor to Republic Aviation Corporation, near Farmingdale, N. Y., a corporation of Delaware Application May 3, 1954, Serial No. 427,246

3 Claims. (Cl. 220—5)

This invention relates in general to fuel tanks, and more particularly has to do with aircraft fuel tanks of the jettisonable type that are designed to be carried externally of an aircraft and when empty or before combat to be dropped or jettisoned therefrom.

It has become customary to equip aircraft, particularly military aircraft, with fuel tanks or cells that are releasably secured externally to the aircraft and which are jettisoned or dropped after the fuel contained therein has been used, or just prior to aerial combat. Since tanks of this type are expendable and are used in relatively large quantities, it is desirable that the manufacturing cost of the tank, as well as the space required to store a large number thereof, be reduced and held to a minimum.

Among its other objects the present invention contemplates a jettisonable fuel tank that is of relatively simple and inexpensive construction and which is organized and arranged to be transported and stored in a dismantled condition with the major portions or components thereof nested or stored one within the other to the end that a plurality of tanks occupy a minimum of space during storage and transportation.

In addition to the foregoing, tanks of this type are frequently assembled under adverse conditions, e. g., in combat areas, often by inexperienced personnel and without the assistance of special tools. Moreover, when assembled, the tanks must be capable of withstanding rough handling on the ground, as well as substantial aerodynamic loads during flight, without leaking. Hence, it is a further object of this invention to provide a structurally strong, substantially leakproof tank that may be easily assembled by comparatively inexperienced field personnel and with the use of standard readily available tools.

With the above and other objects in view, as will be apparent, this invention consists in the construction, combination and arrangement of parts all as hereinafter more fully described, claimed and illustrated in the accompanying drawings wherein:

Fig. 1 is an exterior elevation of a tank constructed according to the present invention;

Fig. 2 is an elevation of a plurality of fore and aft shell sections of the instant tank nested one within the other for storage and transportation;

Fig. 3 is a fragmentary, longitudinal section through the medial portion of the present tank showing the structural or supporting frame within the tank;

Fig. 4 is a fragmentary, vertical section taken longitudinally through the central portion of the tank to show a side view of the structural frame within the tank;

Fig. 5 is a transverse section taken along line 5—5 of Fig. 4 to show part of the internal structural frame of the tank which carries and reinforces the means for attaching the tank to an aircraft;

Fig. 6 is a transverse section taken along line 6—6 of Fig. 4 and shows the cooperation of the bulkhead of the internal structural frame with the shells of the tank;

Fig. 7 is a transverse section taken along line 7—7 of Fig. 1 to illustrate the means for securing a sealing member disposed at the junction or between the shells of the assembled tank;

Fig. 8 is a section taken along line 8—8 of Fig. 3, and shows the means for fastening the shell to the internal structural frame and the seal associated with such fastening means, prior to complete assembly; and Fig. 9 is a section similar to Fig. 8 to illustrate the fastening means and associated seal in fully installed positions.

Referring to the drawings and more particularly to Fig. 1, the tank contemplated herein comprises forward and aft shells or hollow sections 10 and 11, respectively, each of which is substantially conical or bullet-shaped in form at its outer end and flares outwardly from a selected position or station to an open end or base. As shown in Figs. 1 and 2, aft shell 11 is somewhat longer and tapered more sharply than the forward shell 10. Due to the foregoing configuration a plurality of forward sections or shells 10 may be nested partially one within the other and a plurality of aft sections or shells 11 may be similarly nested to be then disposed, as a unit, within the nested forward sections, all as shown in Fig. 2.

One forward shell or section 10 is combined with one aft shell or section 11 to constitute a single tank. These forward and aft sections are mounted on and encase or surround an internal structural frame disposed centrally in the assembled tank and projecting into the base or open end of each shell or section.

This internal supporting frame over and to which a forward shell 10 and an aft shell 11 are joined at their open ends or bases to form a tank, consists of the fore and aft bulkheads 12 and 13, respectively, joined and held in spaced parallel relationship to each other by a pair of spaced upper beams 14 and 14a and a pair of spaced lower beams 15 and 15a.

More particularly, the forward bulkhead 12 comprises a relatively flat circular plate 16 pierced by several openings 17 and having a peripheral flange 18 normal to its edge. To strengthen bulkhead 12 and also to provide means for securing the bulkhead to the upper and lower beams 14, 14a, 15 and 15a a pair of channels 19 and 20 are disposed within flange 18 in parallel relationship with each other and spaced equi-distantly from the vertical axis of the plate 16. Channel 19 is substantially U-shaped in cross-section having a web 21 and parallel edge flanges 22 and 23. It is secured to the plate 16 of bulkhead 12 by suitable securing means such as rivets 24 that pass through registered openings in the web 21 and the plate 16. Channel 20 is constructed similarly to and is mounted in the same manner as channel 19 and includes a web 25 that is secured to the plate 16 by rivets 26 and parallel edge flanges 27 and 28 spaced by the web 25.

The aft bulkhead 13 is constructed and arranged after the manner of forward bulkhead 12 and includes a circular plate 29 having a plurality of openings formed therethrough similar to the openings 17 in plate 16 and a peripheral flange 30 normal to plate 29. Reinforcing and mounting channels 31 and 32, the former including a web 33 and parallel edge flanges 34 and 35 and the latter a web 36 and parallel edge flanges 37 and 38, are mounted or secured to circular plate 29 equidistantly on opposite sides of its vertical axis by suitable fastening means such as the rivets 24 and 26 of channels 19 and 20.

The bulkheads 12 and 13 are positioned parallel with the channels 19 and 20 attached to the plate 16 facing and parallel to the channels 31 and 32 secured to plate 29. The upper beams 14 and 14a are interposed between the upper ends of the aligned pairs of channels to which their ends are releasably connected. More specifically, beam 14 is substantially Z-shaped in cross-section and includes a web 39 provided with oppositely disposed upper and lower edge flanges 40 and 41, respectively. These flanges 40 and 41 terminate inwardly of the ends of the web 39 to create an extension or ear 42 at each end of beam 14 that is releasably secured to the upper portions of flanges 23 and 35 respectively of the channels 19 and 31 by any suitable means such as bolts 43. The other upper beam 14a is similar in construction and arrangement to beam 14 and has a web 44 provided with upper and lower edge flanges 45 and 46. As with the web 39 of the beam 14, the web 44 of beam 14a is provided at its opposite ends with extensions or ears 47 that are releasably secured to the flanges 27 and 37 respectively of channels 20 and 32 by bolts 48.

The bulkheads 12 and 13 are also connected together at the lower ends of the channels by the beams 15 and 15a. Beam 15 is substantially U-shaped in cross-section and comprises a web 49 having upper and lower edge flanges 50 and 51. At its opposite ends, web 49 is provided with extensions or ears 52 that are releasably secured to the lower portions of flanges 23 and 35 of channels 19 and 31, respectively, by bolts 53 that pass through registered openings in the flanges and the ears of the beam. The beam 15a is similarly constructed and mounted having a web 54 and upper and lower edge flanges 55 and 56, respectively. As with the web 49 of beam 15, the web 54 of beam 15a is provided with ears at its ends (not shown) that are releasably secured by bolts 57 to the lower portions of the flanges 27 and 37 of channels 20 and 32, respectively.

Thus a structural frame assembly having the general characteristics of a box beam is created consisting of the spaced parallel bulkheads 12 and 13, the bulkhead 12 being reinforced by the parallel channels 19 and 20 and the bulkhead 13 being reinforced by the parallel channels 31 and 32, and the beams 14 and 14a connecting the upper corresponding ends of said channels and the beams 15 and 15a connecting the lower corresponding ends of said channels. This structural frame is assembled first and its ends are then encased by and surrounded by an aft shell 11 and a forward shell 10 in the assembly of the tank as will be described.

As shown in Figs. 3, 4 and 6 the bulkheads 12 and 13 and their respective flanges 18 and 30 are so dimensioned that when a forward shell 10 is positioned over and surrounds the bulkhead 12 and an aft shell 11 is positioned over and surrounds the aft bulkhead 13 and with the open or base ends of said shells adjacent to each other at approximately the middle or center portions of the beams 14, 14a, 15 and 15a, the flange 18 of the forward bulkhead 12 rests substantially flush against the inner surface of shell 10 at about the point where it begins to flare outwardly towards toward its base or open end while the flange 31 of the aft bulkhead 13 rests substantially flush against the inner surface of shell 11 at the station or point where it begins to flare outwardly to its open end or base. Moreover, the upper flanges 40 and 45 of beams 14 and 14a and the lower flanges 51 and 56 of beams 15 and 15a are curved to agree with and follow the contours of the inner surfaces of the shells 10 and 11 to the end that when the shells are assembled on the structural frame the flanges 40 and 45, 51 and 56 are also in approximate bearing contact with the inner surfaces of the shells 10 and 11.

To assist in aligning the bases or open ends of the shells 10 and 11, and to underlie the junction between the open ends of said shell an annular ring 58 is press fitted into the open end of the forward shell 10 and extends into the adjoining open end of the aft shell 11. This ring 58 is provided with a relatively small bead or flange 59 centrally on its outer face which projects between and bears against the edges of the shells disposed on opposite sides of said bead or flange. When the tank is fully assembled the edge surface of this bead or flange is flush with and forms a continuation of the adjacent outer surfaces of the shells 10 and 11.

The shells 10 and 11 are attached to the beams 14 and 14a of the structural frame, and for that purpose a plurality of spaced longitudinally aligned openings 60 pierce the shells adjacent their base portions. These openings 60 are arranged or positioned to register with a plurality of similarly placed openings 61 formed through the upper flanges 40 and 45 of the beams 14 and 14a. As shown in Figs. 8 and 9, each opening 61 in the flanges 40 and 45 is recessed or countersunk, as at 62, and a plate or anchor nut 63 is fixedly mounted to the underside of the flange in registration therewith. A bolt 64 having a head 65 and a shank 66 is adapted to pass through the registered openings 60 and 61 to have its threaded end 66a engage with the threads of the plate nut 63. A washer 67 fabricated from a suitable plastic material such as polymeric amide is loosely mounted on the shank 66 of the bolt 64 immediately adjacent the head 65 to be ultimately disposed between the head 65 and the outer or underlying surface of the associated shell. The washer 67 is fabricated in the form of a frustum of a cone and the slope of the side wall thereof is substantially equal to the slope of the wall of the recess 62. Therefore, when the bolt 64 is threaded home into plate nut 63, the washer 67 serves to dimple the material of the shell surrounding the opening 60 by depressing or bending it into the recess 62 and into intimate contact with the wall thereof. In this manner the material of the shell defining the opening 60 is sealingly clamped between the washer 67 and the wall of the recess 62. Thus when the bolt 64 is fully engaged with the plate nut 63 the washer 67 on one side is in tight sealing engagement with the adjacent surface of the head 65 of the bolt and on the other side its sloping side wall thereof similarly bears on the adjacent surface of the shell so that the latter is tightly clamped against the sloping wall of the recess 62. It is manifest therefore that the foregoing construction provides an effective sealing means to prevent leakage from within the tank at all points of attachment between the structural frame and the shells 10 and 11. Since the material surrounding the opening 60 in the shell is bent into the recess 62 it is clear that the shell can withstand successfully relatively high shear loads.

When the shells 10 and 11 have been mounted over and secured to the internal structural frame assembly, as aforesaid, the space between the adjacent open ends thereof is closed and sealed by the bead 59 of the ring 58. An additional seal is provided by a strip 68 of resilient material, such as rubber or the like, which overlies the junction between the shells 10 and 11 and is clampingly held in place by a strap 69 that is disposed over the strip 68. More particularly, the strip 68 is positioned to encircle the base ends of the shells 10 and 11 and overlies the space between them. The strap 69 is dimensioned to be disposed over and enclose strip 68 and is provided with any suitable latching means 70 at its adjacent ends for placing the strap under tension. An example of a suitable latching means 70 consists of a catch 71 that is carried at and secured to one end of the strap 69, a threaded bolt 72 having a crosshead 73 that is pivotally mounted in a keeper 74 secured to the opposite end of the strap 69. The threaded shank 75 of the bolt 72 has a collar 76 mounted to slide freely thereon which carries a head 77 that is adapted to bear on the catch 71 in opposition to the keeper 74. A nut 78 is threaded on the end portion of the shank 75 to operate against the outer end of the collar 76. When head 77 is engaged with catch 71, the rotation of nut 78 draws the bolt 72 through member 76 to place the strap 69 under tension thereby securing strip 68 in position to seal and close the joint between the adjacent open or base ends of the shells 10 and 11.

To provide means whereby the tank thus formed may be mounted to a supporting structure such as the underside of an aircraft wing or fuselage, and farther to strengthen the internal frame assembly, a pair of transverse or cross-members 79 are disposed between the beams 14 and 14a, one disposed within and adjacent the open end of shell 10 and the other disposed within and adjacent the open end of shell 11. Since these members 79 are identical in construction and mounting, only one will be described.

As shown more particularly in Figs. 1 and 5, member 79 comprises a casting or forging having a pair of transversely spaced ears 80 at each of its ends to rest against the inner surfaces of webs 39 and 44 of the beams 14 and 14a adjacent their respective upper flanges 40 and 45. These ears 80 are releasably secured to the webs 39 and 44 by any suitable means such as the bolts 81 passing through registered openings in the associated ears and webs. The member 79 is provided with a pair of spaced bosses 82 that are formed on the top portion of the member and disposed equidistantly on either side of its center. Each boss 82 is drilled and tapped as at 83 and the upper surface of each boss 82 is curved to follow and rest against the inner surface of the associated shell. An eye 84 having outstanding lateral flanges 85, the lower surfaces of which are designed to rest flush against the outer surface of the underlying shell in opposition to the bosses 82 is secured to cross-member 79 by bolts 86 passing through registered openings in the flanges 85 and underlying shell to be threaded into the tapped holes 83 in the bosses 82.

In the event sway braces or other guides are employed between the airplane and the tank, the cross-member 79 is provided with integral pads 87 disposed outwardly of the bosses 82 and curved in agreement with the inside contour of the associated shell so that they may rest flush against the inner surface of said shell. These pads 87 are so positioned that the sway-braces or other guide means (not shown) contact and bear against the exterior surfaces of the shells 10 and 11 in direct alignment with the pad whereby all loads are transmitted to the pads and the cross members 79.

It is manifest from the foregoing that a plurality of forward sections or shells 10 can be nested one within the other and a similar number of aft sections or shells 11 also can be nested in a like manner and then disposed within the nested forward sections or shells (Fig. 2). The required number of fore and aft bulkheads 12 and 13, respectively, beams 14, 14a, 15 and 15a, guide rings 58, strips 68, straps 69, cross members 79, eyes 82, bolts 43, 48, 53, 57, 64, 81 and 86, and the washers 67 for bolts 64 can be suitably packaged and disposed within the nested shells 11 or the container (not shown) within which the nested shells 10 and 11 are packed. Thus, a plurality of the tanks or containers contemplated herein can be shipped and stored within a space substantially smaller than would be required for the same number of assembled tanks.

To assemble one or more of the tanks contemplated herein, a forward bulkhead 12 and an aft bulkhead 13 are positioned so that their respective reinforcing channels 19 and 20 and 31 and 32 face each other in parallel relationship. The opposite ends of beam 14 are secured to reinforcing channels 19 and 32 by the bolts 43 passing through the registered openings in the ears 42 of the beam 14 and in the channel members. The beam 14a is similarly secured to channel members 20 and 32 by bolts 48. The lower beams 15 and 15a are secured to channel members 19 and 31 and 20 and 32, respectively, by bolts 53 and 57 passing through registered openings in the beams and channel members. The pair of cross-members 79 are then positioned between the beams 14 and 14a and the lugs 80 of the former are secured by bolts 81 to the webs 39 and 44 of the latter.

A forward section 10 is then removed from the nested sections and a guide ring 58 inserted in the open or base end thereof. The section 10 and guide ring 58 are then slipped over the fore bulkhead 12 and associated frame assembly until the ring 58 is positioned at the approximate center of the beams with the openings 60 registered with their companion openings 61 in the beams 14 and 14a. The forward section 10 is then secured in place by passing bolts 64 through the registered openings 60 and 61 into plate nuts 63 underlying the openings 61. As the bolts 64 are tightened, the washer 67 disposed on the shank 66 of each of the bolts 64 depresses or forces the material of shell 10 defining and surrounding the opening 60 into the recess or countersunk portion 62 surrounding the opening 61 in the beam. When each bolt 64 is fully tightened, the washer 67 serves to prevent leakage along and around the bolt 64 and between the adjacent surfaces of the material of the shell 10 depressed into the countersunk portion 62.

After the forward section or shell 10 has been positioned and secured as aforesaid, an aft section 11 is withdrawn from the nested sections 11 and slipped over the aft bulkhead 13, the associated frame assembly and at its base or open end receives the guide ring 58. As with the forward shell 10, aft shell 11 is secured to beams 14 and 14a by bolts 64.

To close and seal the joint or space between the adjacent open or base ends of the forward and aft shells 10 and 11 thus assembled, the resilient strip 68 is placed over the joint between said shells and strap 69 adjusted to clamp the strip 68 securely and sealingly in place.

The eyes 84 are then positioned on the shells 10 and 11 with the openings in the flanges 85 thereof in registration with the openings through the shells which, in turn, are registered with the tapped holes 83 in the bosses 82 of the cross-members 79. Bolts 86 are passed through the registered openings into the tapped holes 83 and tightened to secure the hooks 84 to the exterior of the center portion of the assembled tank, one eye 84 being disposed on each side of the joint between the shells 10 and 11.

It is to be understood that the tank thus formed is also provided with any means (not shown) for filling and withdrawing fuel therefrom.

What is claimed is:

1. In an external tank for aircraft, said tank being adapted to be shipped and stored when dismantled and to be assembled prior to use, the combination comprising a pair of shells consisting of a forward shell and a rear shell, each shell being open at one end and closed at the other, the forward shell being flared outwardly from a point inwardly of its open end whereby a plurality of said forward shells may be nested partly one within the other and the rear shell being flared outwardly from a point inwardly of its open end at a different degree of flare than the flare of the forward shell whereby a plurality of said rear shells may be nested partly one within the other and a nested group of rear shells may be disposed partly within a nested group of forward shells, a rigid frame assembly comprising a pair of circular bulkheads each having a peripheral flange, the flange of one of said bulkheads conforming to the interior surface of the forward shell at the point where it flares outwardly and the flange of the other bulkhead conforming to the interior surface of the rear shell at the point where it flares outwardly, a plurality of longitudinal beams secured at their opposite ends to said bulkheads to thereby connect and retain the same in spaced parallel relation, each of said longitudinal beams having a flange disposed to rest flush against the adjacent interior surface of said shells, said forward and rear shells being telescoped over said rigid frame assembly with their open ends in substantial abutment and their interior surfaces resting flush against the flanges of said bulkheads and beams as aforesaid, means to secure said shells to and support such shells on the portions of the longitudinal beam flanges disposed therein, and means secured to said frame assembly for attaching the assembled tank to an aircraft.

2. In an external fuel tank for aircraft, the combination comprising a pair of hollow shells each having an open end, a rigid frame assembly including a pair of bulkheads each having a periphery substantially equal to the inside diameter of and conforming to the inside contour of said shells and a peripheral lateral flange, a plurality of longitudinal beams extending between the adjacent surfaces of said bulkheads and secured at their opposite ends thereto to connect and retain said bulkheads in spaced parallel relationship, and a plurality of transverse beams disposed between and secured at their opposite ends to said longitudinal beams to connect and retain said longitudinal beams in spaced parallel relationship, each of said beams having a flange disposed in the plane of the flanges of said bulkheads, said shells being telescoped over the end portions of said frame assembly with the interior surfaces thereof resting in substantially flush contact with the flanges of said bulkheads and beams and abutting centrally of the length of the frame assembly, and means securing said shells to and supporting said shells on the beams of said frame assembly to thereby form the tank, said frame assembly being constructed and arranged to be disposed in the medial portion only of the assembled tank.

3. In an external fuel tank for aircraft, said tank adapted to be stored and shipped when dismantled and assembled prior to use, the combination comprising a pair of hollow shells each having an open base and adapted to be nested one within the other before assembly and to be assembled with their bases in substantial abutment to form the tank, a rigid internal frame assembly comprising a pair of circular bulkheads each having a peripheral flange, a first pair of spaced longitudinal beams connected at their opposite ends to the upper part of said bulkheads adjacent to the peripheries thereof, a second pair of spaced longitudinal beams connected at their opposite ends to the lower part of said bulkheads adjacent to the peripheries thereof and a pair of transverse beams connected at their opposite ends between said first pair of longitudinal beams, said first and second pairs of beams holding said bulkheads in spaced relation and forming therewith a box beam assembly, each of said beams aforesaid having a flange disposed in the plane of the flanges of said bulkheads, said shells being telescoped over said frame assembly in base-to-base abutting relationship with the interior surfaces thereof resting flush against the flanges of said bulkheads and beams and with said frame assembly situated in the central portion only of the tank thus formed, means for sealingly securing and supporting said shells to the flanges of said beams, means for sealing the joint between the abutting bases of said shells, and means secured to the transverse beams of said frame assembly for attaching the assembled tank to an aircraft.

References Cited in the file of this patent

UNITED STATES PATENTS

| | | |
|---|---|---|
| 1,354,677 | Mix | Oct. 5, 1920 |
| 1,398,298 | Irvin | Nov. 29, 1921 |
| 1,595,633 | Twait | Aug. 10, 1926 |
| 2,011,161 | Robinson | Aug. 13, 1935 |
| 2,019,272 | Ragsdale | Oct. 29, 1935 |
| 2,365,080 | Humphreys | Dec. 12, 1944 |
| 2,426,423 | Woolsey | Aug. 26, 1947 |
| 2,455,838 | Wallis | Dec. 7, 1948 |
| 2,471,296 | Allen et al. | May 24, 1949 |
| 2,513,636 | Fulton | July 4, 1950 |
| 2,566,777 | Schmidt | Sept. 4, 1951 |
| 2,585,557 | Kreimendahl | Feb. 12, 1952 |
| 2,686,609 | Fletcher | Aug. 17, 1954 |
| 2,700,458 | Brown | Jan. 25, 1955 |

FOREIGN PATENTS

| | | |
|---|---|---|
| 20,895 | Great Britain | 1895 |
| 225,669 | Great Britain | Dec. 11, 1924 |
| 328,136 | Italy | Aug. 30, 1935 |
| 962,433 | France | Dec. 12, 1949 |